July 14, 1925.
Re. 16,114
C. E. FOLK
DEVICE FOR SQUARING PISTONS AND SCRAPING BEARINGS
Original Filed May 27, 1921
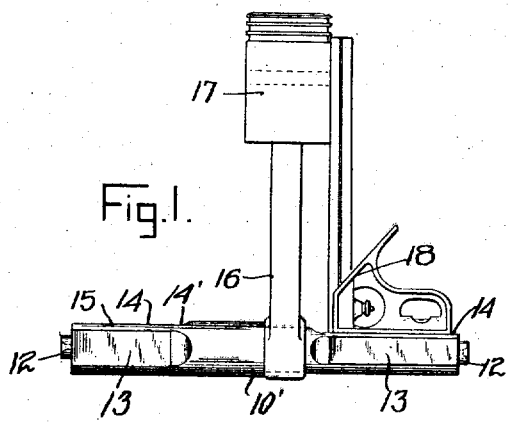
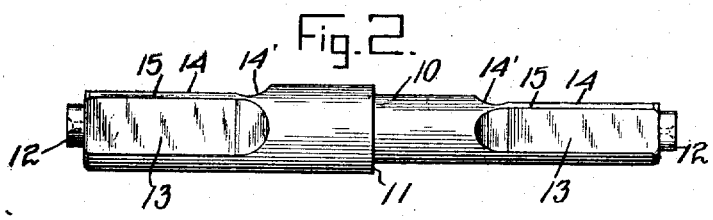
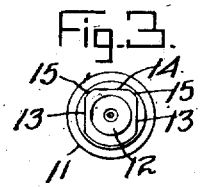
Inventor
Charles E. Folk
By E. W. Bradford
Attorney Reissued July 14, 1925. Re. 16,114

UNITED STATES PATENT OFFICE.

CHARLES E. FOLK, OF HAGERSTOWN, MARYLAND.

DEVICE FOR SQUARING PISTONS AND SCRAPING BEARINGS.

Original No. 1,438,478, dated December 12, 1922, Serial No. 473,031, filed May 27, 1921. Application for reissue filed January 15, 1923. Serial No. 612,858.

*To all whom it may concern:*

Be it known that I, CHARLES E. FOLK, a citizen of the United States, residing at Hagerstown, in the county of Washington and State of Maryland, have invented certain new and useful Improvements in a Device for Squaring Pistons and Scraping Bearings, of which the following is a specification.

This invention relates to improvements in devices for squaring pistons and scraping bearings, and has for its object to provide a simple, cheap and efficient device for setting pistons true on the crank-shaft, and for scraping the crank-shaft bearings.

The invention consists of the novel construction and arrangement of the parts and combination of parts hereinafter more fully set forth in the following specification and pointed out in detail in the appended claims.

Referring to the accompanying drawing which is made a part hereof and on which similar reference characters indicate similar parts, Figure 1 is a side view of my invention projecting through the end of a connecting rod and showing the piston being squared thereon.

Figure 2 is an enlarged side view of my invention, and

Figure 3 is an end view of Figure 2.

In the drawing reference character 10 designates the central portion of a metal mandrel which is cylindrical, one half of the said mandrel at 10′ being larger in circumference than the other half in order to accommodate different sizes of bearings and providing an annular shoulder 11. The outer ends of said mandrel 10 are provided with central lugs 12 adapted to be held in a chuck. Back of said lugs 12 the ends are provided with flat surfaces 13 on opposite sides thereof so that the device can be held between the jaws of a vise, the upper surfaces 14 of said ends being flat for the purpose of holding a square or other suitable instrument when the piston is being squared on the connecting rod. The parts 14′ between the flat faces 14 and the round parts 10, 10′ are preferably ground lower than the flat faces. The edges of the parts at 15, left between adjacent flat surfaces 13 and 14, are sharp and afford cutting edges for the purpose of scraping the bearing.

When the bearings are to be scraped the mandrel is inserted into the piston rod until the latter rests over the edges 5 when the said mandrel can be revolved in the rod 6 thus thoroughly scraping the bearing of said rod. For this purpose the mandrel is preferably placed in a lathe with the centers of the lathe engaging the lugs 12. A few turns of the lathe will give a perfect bearing. The mandrel may also be held in a vise and the connecting-rod turned by hand if desired.

After the connecting-rod bearing is scraped the piston will frequently be out of square with the crankpin. To correct this the piston bearing is placed on the rounded part of the mandrel, which is held in horizontal position in a vise, such movement being limited by the shoulder 11 in Figure 1. The gauge 18 is then placed with its base on the flat surface 14 and its other side extending alongside the piston. The low rounded surfaces at 14′ now insure that the corner of the gauge shall not rest on an incline and thus throw the long side out of true perpendicular relative to the axis of the mandrel. The piston may then be squared up perfectly and is ready for replacement on the engine crankshaft. A similar test may be made after installing a new wristpin or a new wristpin bushing.

It is also desirable to test the alinement of the wristpin with the crankshaft and this is done by placing the square with its edge parallel to a longitudinal edge on the mandrel, when the upwardly extending part of the square will show the relative position of the wristpin and the connecting-rod can be twisted to correct the same, if needed. The same test may be made with a surface gauge.

It will be obvious to those skilled in the art that my device can be modified in numerous respects and therefore I do not limit myself to what is shown in the drawings and described in the specification, but only as indicated in the appended claims.

Having thus fully described my said invention, what I claim as new and desire to secure by Letters Patent, is:

1. A device for squaring pistons and scraping bearings, having a cylindrical middle portion, flat opposite side surfaces at each end thereof, and a flat intervening surface, and cutting edges on each side of the flat intervening surface, substantially as set forth.

2. A device for squaring pistons and scraping bearings, comprising a mandrel, one half of which is larger in circumference than the other half and having a cylindrical middle portion, flat opposite side surfaces at each end of said mandrel, a flat intervening surface, and a lug on each end of said mandrel, substantially as set forth.

3. A device for squaring pistons and scraping bearings, comprising a mandrel having a cylindrical middle portion, flat opposite side surfaces at the ends, and a flat intervening surface, cutting edges at each side of said flat intervening surface, and a lug projecting from each end of said mandrel, substantially as set forth.

4. A device for squaring pistons and reaming bearings comprising a reamer having cutting edges, a flat gaging surface between the said edges and a cylindrical portion of the same diameter as the cutting portion, the flat surface and the axis of the cylindrical portion being parallel, substantially as set forth.

5. A device for squaring pistons and reaming bearings comprising a reamer having one or more cutting edges and a cylindrical mandrel portion having the same radius as the cutting edges, a flat gaging surface parallel to the axis of said cylindrical portion, and an edge for alining piston pins said edge being formed by a side of said surface and being parallel to the axis of said cylindrical mandrel portion, substantially as set forth.

6. A tool for squaring pistons and reaming bearings comprising a cylindrical bar having opposed flat holding surfaces at one end, a flat gaging surface perpendicular to the other two surfaces and parallel to the axis of the cylindrical part of the bar, one or more cutting edges coaxial with the cylindrical part of the bar and of equal radial distance from the axis, and a rounded face opposite the third flat side adapted to polish the inner surface of a bearing, substantially as set forth.

7. A tool for squaring pistons comprising a bar provided with means for scraping a piston bearing and being reduced at opposite sides for a part of its length to form parallel flat holding faces and at a third side to provide a gaging face perpendicular to said parallel faces, substantially as set forth.

8. A combined tool for squaring pistons and scraping bearings comprising a bar cylindrical at one end with two oppositely located flat faces, a flat gaging face between the two and perpendicular thereto, and one or more longitudinal cutting edges on a radius equal to that of the cylindrical part of the bar and parallel to the axis thereof, substantially as set forth.

9. A device for squaring pistons and reaming bearings comprising a reamer having one or more cutting edges, a cylindrical mandrel portion having the same radius as said cutting edges and a flat gaging surface said surface being parallel to the axis of the mandrel portion, substantially as set forth.

10. A device for scraping bearings and squaring pistons comprising a reamer having one or more cutting edges, a cylindrical mandrel portion of equal radius with said cutting edges, a shoulder at one end of said cylindrical portion, and a flat face spaced from the other end of the cylindrical portion by a transverse depression said face being parallel to the axis of the cylindrical portion, substantially as set forth.

11. A device for scraping bearings and squaring pistons comprising a bar having means for scraping the inner periphery of a piston bearing, a flat upper face parallel to the axis of the bar for coacting with a gage in squaring a piston while its bearing is located on the bar and means to coact with a supporting device in locating said upper face in fixed horizontal position, substantially as set forth.

12. A combined tool for squaring pistons and scraping bearings comprising a bar having a cylindrical portion to fit in the bearing of a connecting rod said bar being provided at one end with two oppositely located flat faces, a flat gaging face between the two and perpendicular thereto, and one or more longitudinal cutting edges each cutting edge extending from said cylindrical portion to one end of the device, substantially as set forth.

13. A device for scraping bearing squaring pistons and alining piston pins comprising a cylindrical shank having flat side faces, and a horizontal upper face between the side faces the edges between adjacent faces being parallel to the axis of the shank and means adjacent to said horizontal face for scraping a bearing, substantially as set forth.

14. A tool for scraping bearings and squaring pistons comprising a bar provided with means for scraping the inner surface of a piston rod bearing, a cylindrical part, a flat face at one end of the bar, and a flat face at right angles to said first-named flat face arranged to coact with one side of a square in squaring the piston on a piston rod supported on said cylindrical part of the tool, substantially as set forth.

15. A combined tool comprising a mandrel having a cutting or scaping edge parallel to the axis of the mandrel, a cylindrical portion, and a flat face extending from the said cylindrical portion to one end of the mandrel, substantially as set forth.

16. A combined tool comprising a mandrel having a cutting or scraping edge parallel to the axis of the mandrel, a cylindrical portion, and an edge extending from the cylindrical portion to one end of the mandrel for use in alining the piston pin of a rod having its bearing on said cylindrical portion, substantially as set forth.

17. A combined tool comprising a bar, means on the bar for scraping bearings, a cylindrical portion on the bar fitting in a connecting rod bearing, a flat face on the rod extending from said cylindrical portion toward one end of the rod for supporting piston-alining means, and another flat face on the rod arranged to cooperate with a tool support in maintaining the rod with the first-named flat side at the top, substantially as set forth.

18. A combined tool comprising a bar, means on the bar for scraping bearings, a cylindrical portion on the bar fitting in a connecting rod bearing, a flat face on the rod extending from said cylindrical portion toward one end of the rod for supporting piston-alining means, and an edge along said side parallel to the axis of the rod for use in alining piston pins, substantially as set forth.

19. A device for squaring pistons and reaming bearings comprising a reamer having one or more cutting edges and a cylindrical mandrel portion having the same radius as the cutting edges, a flat gaging surface parallel to the axis of said bar, and an edge for squaring piston pins said edge being formed by a side of said surface and being parallel to the axis of said bar, substantially as set forth.

20. A tool for squaring pistons and reaming bearings comprising a bar having a cylindrical portion of a size to fit in the bearing of a piston rod, a flat gaging face extending from said part to one end of the rod, means parallel to the axis of the bar for alining piston pins, one or more cutting or scraping edges, and a rounded face following said edges for smoothing the inner surface of the bearing at each relative rotation of the mandrel and the bearing, substantially as set forth.

21. A combined tool for squaring pistons and scraping piston rod bearings comprising a cylindrical portion to receive a bearing, one or more cutting edges adapted to scrape the bearing to fit said cylindrical portion of the device, and means for alining the wrist pin of the piston rod while its bearing is on said cylindrical portion, substantially as set forth.

22. A tool for squaring pistons and alining piston pins provided with means for scraping connecting rod bearings, a cylindrical part to fit in such connecting rod bearings, and a flat gauging face adjacent to said cylindrical part said face being parallel to the axis of the tool and having an edge parallel to said axis adapted to co-act with a gauge in testing the alinement of the wrist pin on a connecting rod supported on said cylindrical part, substantially as set forth.

In witness whereof, I have hereunto set my hand and seal at Reading, Penna., this 5th day of January, A. D. nineteen hundred and twenty-three.

CHARLES E. FOLK. [L. S.]

Witnesses:

FRANCINA H. FRANCISCUS,
HAZEL C. GEIGER.